United States Patent

Belitskus et al.

Patent Number: 5,371,050
Date of Patent: Dec. 6, 1994

[54] ALUMINUM PHOSPHATE BONDED FIBER REINFORCED COMPOSITE MATERIAL CONTAINING METAL COATED FIBERS

[75] Inventors: David L. Belitskus; Daniel J. Boland, both of New Kensington; W. Thomas Evans, Indiana; William P. Kampert, Lower Burrell; Robert A. Marra, Penn Hills; Larry F. Wieserman, Apollo, all of Pa.

[73] Assignee: Aluminum Company of America, Pittsburgh, Pa.

[21] Appl. No.: 680,489

[22] Filed: Apr. 4, 1991

Related U.S. Application Data

[63] Continuation-in-part of Ser. No. 393,299, Aug. 14, 1989.

[51] Int. Cl.$^5$ .............................................. C04B 35/76
[52] U.S. Cl. ............................................. 501/95; 501/127; 427/181; 427/206; 427/403; 427/404; 427/419.1; 427/443.2; 428/375; 428/379; 428/902
[58] Field of Search ............... 428/236, 375, 156, 237, 428/379, 902; 427/217, 443.2, 403, 404, 419.1, 181, 206; 501/35, 87, 89, 95, 99, 100, 127

[56] References Cited

U.S. PATENT DOCUMENTS

| | | | |
|---|---|---|---|
| 3,730,744 | 5/1973 | Yavorsky | 106/57 |
| 3,957,571 | 5/1976 | Bodycomb, Jr. | 162/3 |
| 3,960,592 | 6/1976 | Birchall et al. | 106/308 |
| 4,158,687 | 6/1979 | Yajima et al. | 264/60 |
| 4,358,500 | 11/1982 | George et al. | 428/246 |
| 4,440,865 | 4/1984 | Salazar | 501/95 |
| 4,547,403 | 10/1985 | Smith | 427/196 |
| 4,558,016 | 12/1985 | Bronson et al. | 501/95 |
| 4,563,219 | 1/1986 | George et al. | 106/287 |
| 4,652,413 | 3/1987 | Tiegs | 264/66 |
| 4,737,192 | 8/1988 | Smith | 106/85 |
| 4,770,707 | 9/1988 | Smith | 106/85 |
| 4,833,025 | 5/1989 | Rossi | 428/357 |

*Primary Examiner*—Donald P. Walsh
*Assistant Examiner*—Ngoclan T. Mai
*Attorney, Agent, or Firm*—David W. Pearce-Smith

[57] ABSTRACT

A method of forming fiber reinforced aluminum phosphate bonded material having improved strength at elevated temperatures. The method comprises the steps of: (a) preparing a slurry by blending alumina and aluminum phosphate solution, the slurry being substantially free of silica; (b) providing a fiber substrate coated with a metal selected from the group consisting of nickel, tungsten, molybdenum, platinum, copper, silver, gold, palladium, cobalt, chromium and titanium; (c) infiltrating the slurry into the fiber substrate; and (d) curing the infiltrated substrate to form a fiber reinforced aluminum phosphate bonded composite material. In a preferred embodiment of the present invention, the fiber substrate is made from SiC fibers and the refractory metal is electrolessly coated nickel.

29 Claims, 3 Drawing Sheets

ALUMINUM PHOSPHATE BONDED FIBER REINFORCED COMPOSITE MATERIAL CONTAINING METAL COATED FIBERS

CROSS REFERENCE TO RELATED APPLICATIONS

This application is a continuation-in-part of U.S. Ser. No. 393,299, filed Aug. 14, 1989 pending.

TECHNICAL FIELD

The present invention relates to ceramic matrix composites having an aluminum phosphate bonded matrix. More particularly, the invention is directed to fiber reinforced aluminum phosphate bonded composites which exhibit high strength at temperatures up to and exceeding approximately 1200° F.

BACKGROUND ART

Increasing demands in the aerospace industry are creating need for lightweight structural materials having increased strength-to-density and increased stiffness-to-density at high temperatures. As high temperature applications have exceeded 1200° C., increased attention has been directed to ceramics such as alumina and silicon carbide. However, the design problems associated with the brittle nature of ceramic materials and the difficulty of fabrication have presented severe obstacles.

Fiber-reinforced composite ceramic articles or CMC's (ceramic matrix composites) are receiving increasing interest in aerospace applications that require properties such as high chemical, wear and corrosion resistance and good structural integrity at high temperatures. Such reinforced ceramics are presently being considered as suitable structural materials for the fabrication of heat exchangers, turbocharger rotors, cylinders, bearings, and other components of heat engines. The incorporation of fiber reinforced ceramic matrix composites will permit heat engines to run more efficiently at higher temperature than heretofore possible with similar components of metal.

Reinforcing ceramic oxides such as alumina ($Al_2O_3$) and alumina phosphate with whiskers or fibers has produced some particularly useful fiber-reinforced composite ceramic materials (see for example U.S. Pat. Nos. 4,158,687, 4,358,500, 4,563,219 and 4,652,413). The fibers function in the composite to substantially increase the fracture toughness of the matrix and thereby inhibit deleterious crack formation and crack growth due to material fatigue.

Silicon carbide reinforced ceramic composite materials have been shown to significantly increase the strength and fracture toughness over conventional ceramics. However, their strength, structural reliability and impact resistance have not met the demands of the high temperature applications (in excess of 1500° F.) for which they are being designed.

In addition to thermal performance problems, there are still problems that exist with the fabrication processes that are presently being used to make fiber reinforced CMCs. Many of the current fabrication techniques are limited to the formation of fiber reinforced ceramic articles which possess relatively simple shapes and shallow thicknesses. For example, the hot pressing of ceramic particulate mixtures in die sets inhibits the fabrication of articles with relatively complex shapes such as turbocharger rotors, cylinders, bearings, and the like. In addition, the hot pressed ceramic reinforced composites require extensive machining and other finishing processes which considerably increase the expense of fabricating structural components of complex shapes.

Another fabrication technique that limits the shapes and thicknesses of fiber reinforced CMCs are those that utilize a binder solution containing a fugitive organic binder. The fugitive organic binder is used in the slurry matrix to improve the adhesion of the matrix to the fibers before sintering. The organic fugitive binders evolve gases that must be completely removed prior to sintering so that voids are not created in the sintered piece. As the cross sectional thickness of the piece increases, the time that the green ceramic article must remain in an oven at a low burn off temperature increases. In addition, as the size and cross sectional thickness of the article increases, the likelihood that the evolved gases will be trapped in the interior of the piece also increases. Therefore, fabrication of pieces by techniques employing fugitive organic binders must employ an additional production step to insure the binders have burned off prior to sintering. This extra step may be quite lengthy and adds both labor costs and energy costs to the process.

Another disadvantage associated with above composite article manufacturing technique, which employs a fugitive organic binder, is that the organic fugitive binders can be a source of unwanted impurities in the resultant composite. The unwanted impurities often result in a lowering of the high temperature properties of the composite article.

Yet another disadvantage of current fabrication techniques is that the matrix does not uniformly surround the fibers. The nonuniformity of the green body results in a nonuniform sintered composite article which may contain voids. This problem can be alleviated to a certain extent by the use of binder solutions which carry ceramic particles further into the fabric (fibers) and into the interior of the article. However, often the fabric acts as a filter which removes ceramic particles from the binder solution. This results in the matrix having a composition which changes as one moves into the interior of the article. This problem of nonuniformity is further aggravated when forming complex and/or three-dimensional composite structures. The problems of nonuniformity can be overcome, however often the labor costs needed to insure compositional uniformity may make the cost of the final product uncompetitive.

Another problem associated with the use of the prior art fabrication techniques is that they involve the mixing of reactive chemicals. Thus for example, in U.S. Pat. No. 3,730,744 the ceramic particles are bonded together by an aluminum dihydrogen orthophosphate bonding solution which is prepared by the reaction of reactive aluminum orthophosphate ($AlPO_4$), aluminum hydroxide or colloidal alumina with hot, concentrated phosphoric acid. In U.S. Pat. No. 4,440,865, the aluminum silicate which is chemically bound by an aluminum phosphate composition formed from liquid aluminum phosphate and phosphoric acid. In U.S. Pat. No. 4,563,219, the inorganic binder solution employed in providing refractory coatings on fabric substrates is prepared from colloidal silica, monoaluminum phosphate (MAP) and aluminum chlorohydrate (ACH) and a catalyst of an alkyl tin halide. U.S. Pat. No. 4,358,500 discloses that the colloidal silica and water in the binder solution act as a moderator to delay the rapid exothermal chemical reaction that would normally occur when MAP is mixed with ACH.

It would be advantageous, therefore, to provide a method of fabricating fiber-reinforced ceramic matrix composites which exhibit a high flexure strength at temperatures in excess of 1500° F. In addition, it would be advantageous to provide a process for economically forming fiber-reinforced ceramic matrix composite articles into relatively complex geometries and sizes.

The principal object of the present invention is to provide a composition for producing a fiber-reinforced aluminum phosphate matrix composite which has a high flexure strength at temperatures in excess of approximately 1500° F.

Another object of the present invention is to provide a method of producing a fiber-reinforced aluminum phosphate matrix composite, which has a high flexure strength at temperatures in excess of approximately 1500° F., that does not involve processing at high temperatures and pressures. These conditions lead to mechanical and chemical damage of the fiber and unfavorable reactions between the fiber and matrix material.

Still another object of the present invention is to provide a low-cost process for producing a fiber-reinforced aluminum phosphate matrix composite that does not require mixing reactive chemicals such as aluminum hydroxide and hot, concentrated phosphoric acid.

A further object of the present invention is to provide a low-cost process for producing a fiber-reinforced aluminum phosphate matrix composite that does not require the addition of colloidal silica in the binder solution to act as a moderator to delay the rapid exothermal chemical reaction that might otherwise occur when using monoaluminum phosphate (MAP) and a reactive chemical like ACH.

Yet another object of the present invention is to provide a low-cost process for producing a fiber-reinforced aluminum phosphate matrix composite that does not require the addition of contaminating fugitive organic binders, which may produce impurities, to improve the adhesion of the matrix to the fibers before sintering.

Another object of the present invention is to provide a process for economically forming fiber-reinforced ceramic matrix composite articles into relatively complex geometries and sizes.

Another object of the present invention is to provide a method of manufacturing fiber-reinforced ceramic matrix composite articles which is less complex, less labor- and energy-intensive and allows for easier production of complex composite articles.

These and other objects and advantages will be more fully understood and appreciated with reference to the following description.

SUMMARY OF THE INVENTION

The present invention discloses a method of forming fiber reinforced aluminum phosphate bonded material having improved strength at elevated temperatures. The method comprises the steps of: (a) providing a refractory fiber substrate; (b) coating the fiber substrate with a metal; (c) providing a slurry prepared by blending alumina and alumina phosphate solution, the slurry being substantially free of silica; (c) infiltrating the solution into the fiber substrate; and (d) curing the infiltrated substrate to form a fiber reinforced aluminum phosphate bonded composite material. In a preferred embodiment of the present invention, the fiber substrate is made from Nicalon ® SiC fibers and the metal is nickel.

Another aspect of this invention is the formation of a fiber-reinforced aluminum phosphate bonded refractory material having improved strength at temperatures up to approximately 1500° F., the method comprising the steps of: (a) providing refractory fiber which have been coated with a metal; (b) providing a slurry prepared by blending alumina and alumina phosphate solution, the slurry being substantially free of silica; (c) impregnating the refractory fiber with slurry; and (d) drying and curing the impregnated refractory fiber to form a fiber reinforced aluminum phosphate bonded material. In a preferred embodiment of this aspect of the present invention, the fibers are Nicalon ® SiC fibers and the refractory metal is nickel.

Yet another aspect of the present invention is the formation of a fiber reinforced aluminum phosphate bonded refractory material having improved strength at elevated temperatures, the refractory material comprising: refractory fiber coated with a metal; a matrix formed from a slurry prepared by blending alumina and alumina phosphate solution. The slurry is preferably substantially free of silica.

In a second embodiment of the present invention, the fiber reinforced aluminum phosphate bonded refractory composite material is prepared using: (a) $Al_2O_3$ filler; (b) $CrO_3$ to further improve high temperature performance; and (c) commercially available aluminum phosphate solutions instead of reactive chemicals such as mixtures of phosphoric acid and aluminum hydroxide.

BRIEF DESCRIPTION OF THE DRAWINGS

Other features of the present invention will be further described or rendered obvious in the following related description of the preferred embodiment which is to be considered together with the accompanying drawings, and further wherein.

DISCLOSURE OF THE INVENTION

Figure 1:
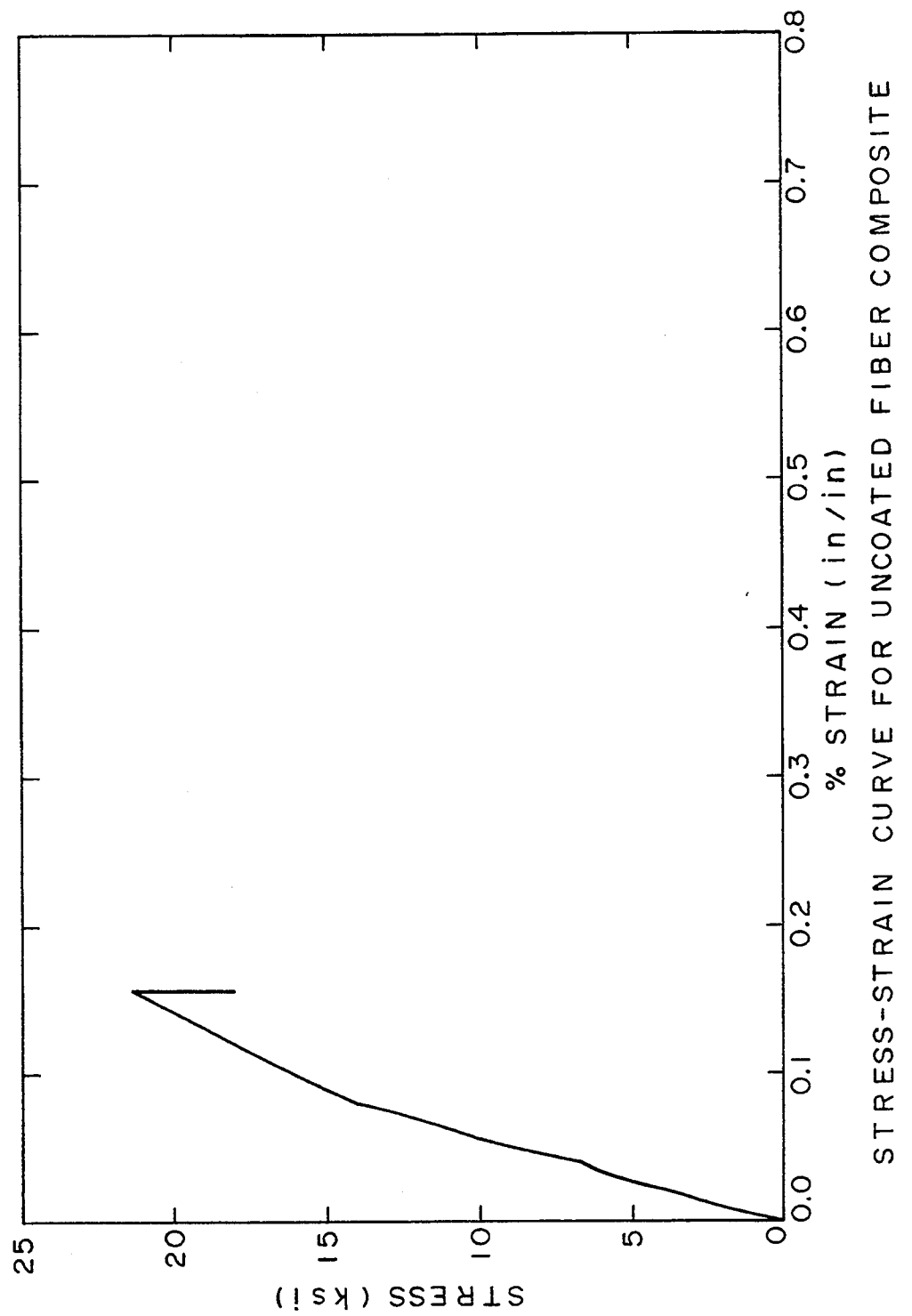
FIG. 1 is a stress strain curve of material containing uncoated fibers.

As generally described above, the present invention is related to aluminum phosphate compositions for reinforcing ceramic fibers. The aluminum phosphate composite material, which is used in forming the matrix of the composite material of the present invention, is formed from a monoaluminum phosphate (MAP) solution and does not require the mixing of reactive chemicals such as aluminum hydroxide and hot, concentrated phosphoric acid. In addition, components made from ceramic reinforced aluminum phosphate material can be formed and processed at temperatures which do not cause chemical damage to the fibers and unfavorable reactions between the fibers and the matrix material. The ceramic reinforced aluminum phosphate material of the present invention can be fabricated into articles of relatively complex shapes with a residual porosity of less than approximately 20%.

The reinforced composite material of the present invention is composed of three constituents; namely the fiber, a fiber coating and the matrix. The fiber itself plays a major role in the ultimate properties of the composite. It is the principal load bearing constituent of the composite. In addition, the fiber serves to restrain crack propagation, to impart stiffness to the matrix, and to lower the overall density of the composite if the fiber density is less than the density of the matrix material.

The preferred amount of fiber for use in the present invention is between about 25 to about 75 vol. %. As will be discussed in greater detail below, the fibers may be woven into a substrate or preform, coated with a layer of refractory metal and then impregnated with a slurry of the matrix material. Alternatively, the coated fibers can be mixed into the slurry.

The preferred fibers for use in the present invention are silicon carbide (SiC) fibers. Nicalon® SiC fibers have been found useful in practicing the present invention. Nicalon® SiC fibers are commercially available from Nippon Carbon Company and distributed by Dow Corning Inc. Nicalon® fibers are continuous fibers of beta silicon carbide ($\beta$.SiC) crystallites randomly arranged in an amorphous matrix containing both excess $SiO_2$ and free carbon.

The second component, metal coated on the surface of the fibers, has been found to be useful in optimizing the high temperature properties of the composite material of the present invention. The refractory metal coating is applied to the fiber as a processing step. The coating controls the wetting and bonding of the fiber and matrix. It also protects the fiber from mechanical and chemical damage, serves as a diffusion barrier, controls fiber spacing and volume fraction, prevents fiber-fiber contact and transfers stresses from the matrix to the fiber. It is preferred that the coating is continuous.

In addition, when oxidizable fibers such as carbon graphite or silicon carbide are used in practicing the present invention, the refractory metal oxide prevents or at least retards oxidation of the fiber at elevated temperatures. It is believed that coating thicknesses within the range of about 100 Angstroms (Å) to 100 microns can be used when practicing the present invention. Preferably, the thickness is between about 1000 Å and 10 microns with the most preferred thickness between about 0.1 to 0.5 microns.

The preferred method of forming a metal layer is electroless plating. Methods for the electroless coating of the fiber with nickel are well known and employ a series of steps which include "sensitizing" the fibers with a reducing agent in the form of a stannous salt solution, "activating" the surface in a noble metal salt solution and then electroless plating the nickel. Such techniques of electroless plating are well known in the art and need not be described in great detail. For the purpose of depositing nickel on the surface of the "activated" and "sensitized" fiber surface, well known electroless nickel plating baths of the type described in Brenner and Reddell, U.S. Pat. No. 2,532,283 or in Gutzeit et al U.S. Pat. Nos. 2,658,841 and 2,658,842 may be employed in practicing the present invention.

When silicon containing fibers are used in practicing the present invention, it is believed that the refractory metal coating prevents or at least retards the formation of silicon phosphate phases from reaction with the matrix material. Although no reaction has been observed in the $SiC$—$H_3PO_4$ system at ambient temperatures, a reaction in the range of approximately 800° C. to 1200° C. (1472° F.–2192° F.) occurs. As will be discussed in greater detail below, low melting silicon phosphate phases will limit the high temperature performance of ceramic matrix composites.

The matrix material also plays a major role in the ultimate properties of the composite. The matrix material transfers and distributes the loads to the fibers. The matrix also serves to bind the fibers together and keep them spaced apart. The matrix may also serve as a crack arrestor.

The matrix material for use in the present invention is formed from an aluminum phosphate and very fine particulate alumina. The term aluminum phosphate is meant to include $AlPO_4$, $Al_2O_3$—$H_3PO_4$ and $Al(H_2PO_4)_3$ and other hydrated and anhydrous forms of aluminum phosphate. The two basic MAP phases for use in the present invention are $Al_2O_3$—$H_3PO_4$ and $Al(OH)_3$—$H_3PO_4$. Reactions between these phases are very complex and involve many intermediate steps. More than fifty aluminum phosphate phases have been identified and only a few of these have good bonding characteristics. The preferred matrix material for use in the present invention is an anhydrous aluminum phosphate and the most preferred matrix material is $AlPO_4$.

Another important aspect of the present invention is that the aluminum phosphate matrix material is substantially free of silica ($SiO_2$). The term "substantially free of silica" is used herein to mean below approximately 7 wt. % silica. $SiO_2$ and $H_3PO_4$ do not normally react at ambient temperatures. However, at higher temperatures (above 300° C. or 572° F.), they react to form $SiO_2.P_2O_5$ and $2SiO_2.P_2O_5$ phases. These silicon phosphate phases have low liquidus temperatures (1000° to 1200° C.) and will therefore lower the hot modulus of rupture (hot MOR) of the matrix material. To minimize the effect of these silicon phosphate phases, it is desirable to keep the wt. % of silica below approximately 7 wt. % silica. The preferred wt. % of silica is below about 5 wt. % and the most preferred is below 1 wt. %.

Alumina ($Al_2O_3$) filler material, which is substantially free of $SiO_2$, has been found to be useful in forming matrix compositions which possess better high temperature properties than those that contain silica. $Al_2O_3$ and $H_3PO_4$ do not react to form low temperature melting phases.

The type of alumina used in the matrix is very important in determining the aluminum phosphate bond phases that will develop. Active aluminas such as hydrates, transition phases (i.e. gamma $Al_2O_3$), react with $H_3PO_4$ rapidly to form secondary and tertiary phosphates which have poor bonding characteristics. High surface area calcined alumina reacts with aluminum phosphate solutions or phosphoric acid to form phases that are easily converted to crystalline $AlPO_4$ phases which have good high temperature stability. The term "high surface area alumina" is used herein to mean alumina that has a surface area greater than approximately 2 $m^2/g$ and preferably greater than 10 $m^2/g$. Less active aluminas such as low surface area calcined alumina (alumina having a surface area of less than approximately 2 $m^2/g$), sintered or tabular alumina, or fused alumina produce amorphous phases with good bonding characteristics but lack high temperature thermal stability. The preferred aluminas for use in the present invention are high surface area calcined aluminas.

The amount of alumina material in the matrix has also been determined to be important for maintaining strength at elevated temperatures. Good high temperature strength has been found using a slurry containing from about 10–70 wt. % of a high surface area alumina in a monophosphate solution. A preferred slurry for use in the present invention contains 33 wt. % high surface area alumina in 67 wt. % MAP. The amount of aluminum in the preferred slurry on an aluminum phosphate basis is 50 wt. %.

The addition of chromic acid to aluminum phosphate matrix material has been found to increase the hot strength and extend the maximum use temperature of the material. The enhancement in strength stability is related to the higher temperature retention of the amorphous bonding phase in the $Al_2O_3$—$Cr_2O_3$—$P_2O_5$ systems. Chromic acid additions have also been found to facilitate the growth of stable phases which do not undergo the crystallographic inversions observed in $AlPO_4$.

EXAMPLE 1

Aluminum phosphate ceramic matrix composite article containing Nicalon ® silicon carbide fibers utilizing the present method was prepared as follows:

Fiber Preparation:

A fabric panel approximately 100×100 cm was prepared from woven Nicalon ® silicon carbide fiber from Dow Corning. The fabric panel was woven in an eight harness satin weave having 22×22 tows per inch and an areal density of 0.245 g/in². The total weight of the fabric panel was 380 grams. The fabric panel was heat cleaned to remove the fabric sizing and any contaminating impurities from their surface.

Matrix Preparation:

A mixture of 33 wt. % Alcoa A-16-SG alumina, and 23.3 wt. % MAP and 13.5 wt. % $H_2O$ was prepared. This was accomplished by first blending the "powder" components together by "tumbling" in a jar and cutting on paper or by using a V-blender.

The powder mixture was then slowly poured into a beaker containing the "liquid" components. The matrix slurry was homogenized by blending in an industrial blender.

Cloth Impregnation:

Slightly more than one-half of the matrix slurry was poured onto the cloth panel. The matrix slurry was then worked into the fabric with a squeegee until a uniform coating is achieved. The cloth is then turned over and the remaining matrix slurry is applied uniformly to the second side using the same technique as was used with the first side.

The impregnated cloth was then cut into eight composite-sized segments by laying out sections with a "straightedge" and cutting the cloth with large shears. The sizes of the eight composite-sized segments were approximately 7.5×18 in.

Lay-up Composite Panel:

The composite-sized segments were placed on a 1/16-inch aluminum sheet. The aluminum sheet was slightly larger than the desired composite-sized segments and served as a base plate. Before placing the first composite-sized segment on the base plate, the base plate was first covered with a sheet of polyethylene terephthalate and then a piece of non-porous fluorocarbon coated fiberglass cloth.

The first composite-sized segment is then placed on the fiberglass coated cloth which covers base plate. The fabric is checked for voids and additional matrix is squeezed into the fabric to fill any voids. The process is repeated with each of the eight segments, one on top of the other, until all of the layers are in place.

The following bleeder plies are then placed on top of the "raw" composite stack:

two pieces of porous fluorocarbon coated fiberglass cloth
two pieces of silicone coated fiberglass cloth
three pieces of fiberglass cloth
a sheet of polyethylene terephthalate material.

Lamination:

The "raw" composite stack was then compacted in a heated laminating press. This was accomplished by heating slowly to 177° C. (350° F.) with 200 psi pressure.

Oven Cure:

The stack is then removed from the press and the "bleeder" plies are striped off. The composite is placed in a drying oven preheated to 177° C. (350° F.). The temperature is ramped to 371° F. (700° F.) and held for 1 hr. The oven temperature is then ramped down to ambient temperature.

Testing:

After cooling, samples were cut into strips with a water-cooled diamond saw to dimensions of:

1 inch wide and approximately 4 inches long for flexural strength testing;

1 inch wide and approximately 15 inches long for tensile strength testing; and

Two specimens for each test were performed at room temperature and 1500° F. (816° C). The average of the two samples was determined and the results are recorded on Table 1. A stress strain curve of the material of Example 1 is seen in FIG. 1.

The tensile strain at failure at room temperature and 1500° F. were both found to be 0.1–0.2%. This is an indication that composite material behaved as a brittle ceramic material at both temperatures. Brittle fracture is an indication of a strong bond between the matrix and the fiber; a crack originating in the matrix propagates through the fiber resulting in a brittle fracture similar to that of the monolithic matrix material.

EXAMPLE 2

The procedure outlined in Example 1 was repeated in Example 2 except that the woven Nicalon ® silicon carbide fiber was electrolessly coated with nickel prior to impregnation. In addition, the samples fabricated contained only five layers of woven fibers.

The electrolessly coating of the fiber with nickel prior to impregnation was accomplished by the following steps taken in order:

(i) immerse fibers for 2 minutes in a solution of tin chloride ($SnCl_2$). The $SnCl_2$ solution was prepared using 1 g/liter $SnCl_2$ and 0.5 cc/liter HCl.

(ii) rinse fibers in deionized water;

(iii) immerse fibers for 2 minutes in a solution of palladium chloride ($PdCl_2$). The $PdCl_2$ solution was prepared using 1 g/liter $PdCl_2$ (5% solution) and 1.0 cc/liter HCl;

(iv) rinse fibers in deionized water;

(v) immerse fibers for 10 minutes in a nickel plating solution. The nickel solution was prepared using 6% Fidelity 4855H, 15% Fidelity 4855BM and 79% deionized water. The Fidelity formulations are commercially available from Fidelity Chemical Products Company, Newark, N.J. The solution was used at 176° F. (80° C.) and the solution had a pH of 4.9; and (vi) rinse in deionized water and dried.

Figure 2:
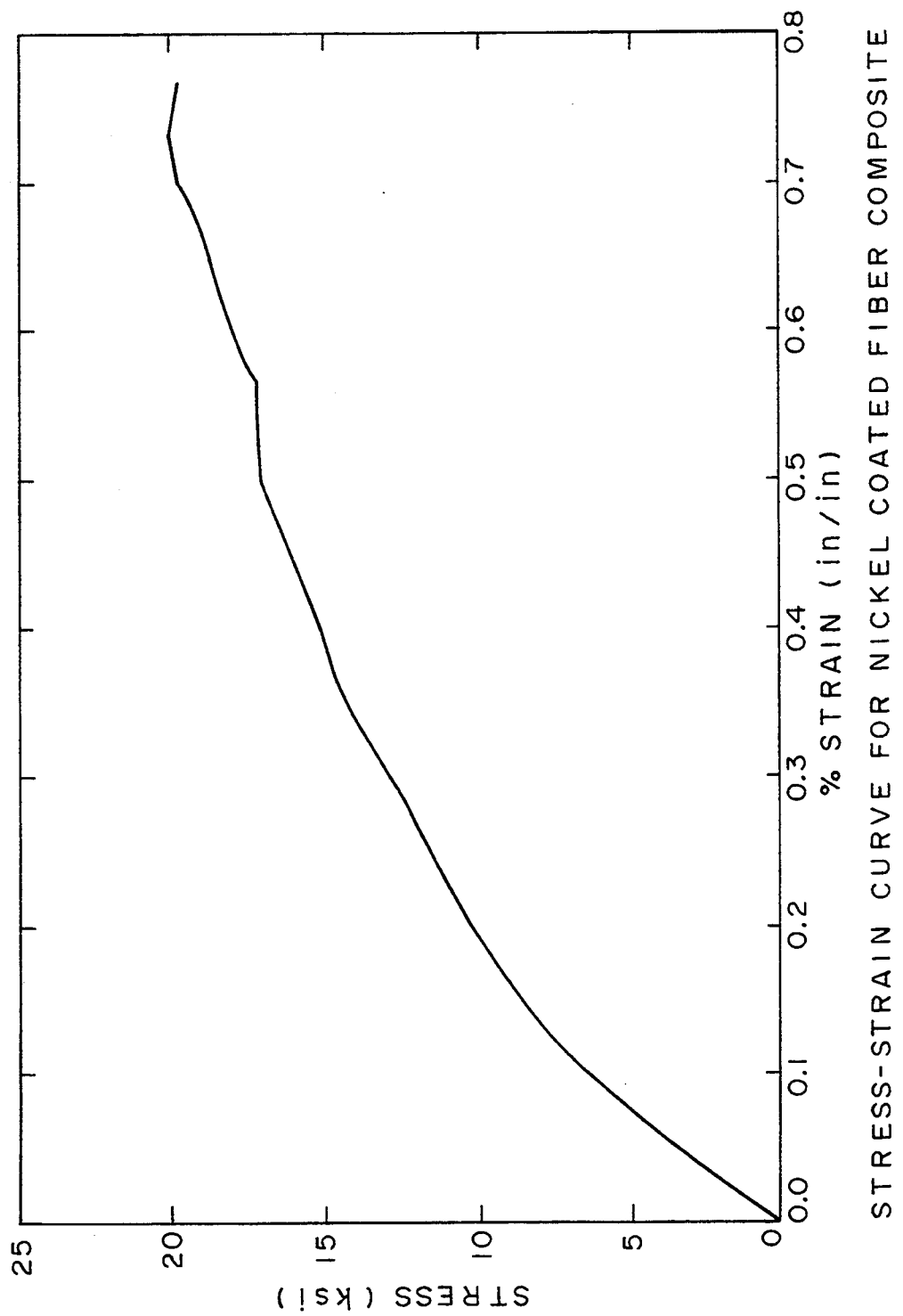
FIG. 2 is a stress strain curve of material of the present invention containing coated fibers.

Testing:

After cooling, samples were cut into strips with a water-cooled diamond saw to dimensions of:

1 in. wide and approximately 4 in. long for flexural strength testing; and 1 in. wide and approximately 4 in. long for tensile strength testing Two specimens for the flexure test were performed at room temperature and 1500° F. (816° C.) Two specimens for the tensile test were performed at room temeprature. The average of the two samples was determined and the results are recorded on Table 1. A small scatter of the data is indicated in Table 1. Stress strain curve of the material of Example 2 is seen in FIG. 2.

Figure 3:
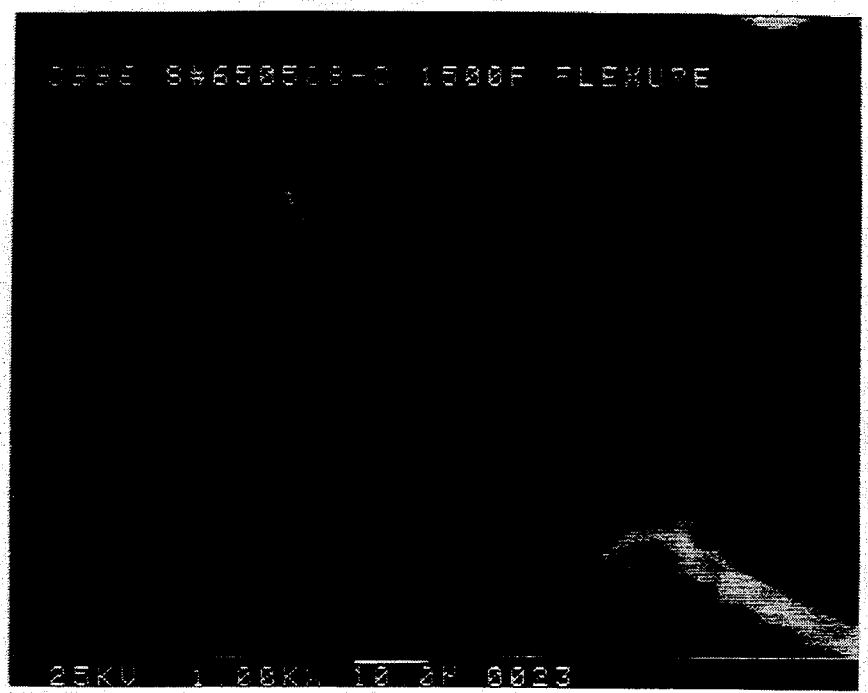
FIG. 3 is a photomicrograph of the material of FIG. 2 at 1000×.

The strain at failure at room temperature and 1500° F. were both found to be 0.6–0.8% in contrast to Example 1 with values of 0.1–0.2%. This is an indication that material behaved as a composite. FIG. 3 is a photomicrograph of the break of the material of Example 2 at 1000×. Composite fracture is the result of an intermediately strong bond between the matrix and the fibers. There are crack deflections at the fiber/matrix interface and sliding of fibers through the cracked matrix prior to and after fiber failure (pullout). This results in pseudoductile composite fracture and translates into a composite that is considered to be tough.

TABLE 1

| Strength (ksi) | Example 1 (Uncoated Fibers) | | Example 2 (Coated Fibers) | |
| --- | --- | --- | --- | --- |
| | RT | 1500° F. | RT | 1500° F. |
| Flexure | 36.8 ± 1.5 | 16.2 ± 1.5 | 21.5 ± 2.1 | 29.1 ± 1.6 |
| Tensile | 20.6 ± 3.0 | 11.2 ± 1.2 | 19.6 ± 0.5 | * |

*no measurement

While the invention has been described in terms of Nicalon ® SiC fibers, the fibers contemplated for use in the present invention include all refractory fibers, including metal fibers, known in the art. Some common fibers which are contemplated for use in the present invention include: carbon, graphite, silicon nitride, boron, boron/tungsten, boron carbide, boron carbide/tungsten, boron nitride, beryllium, and oxides, nitrides and borides such as zircona, alumina and aluminum silicate (mullite) and combinations thereof. The fibers may be continuous or discontinuous, monofilament, untwisted or twisted multi-filament yarns or high bulk filament yarns. The fibers may also be randomly oriented, unidirectional or woven. The variety of fiber architecture used to reinforce the ceramic component may be any of those taught in "Preform Fiber Architecture for Ceramic Matrix Composites", Frank K. Ko, *Ceramic Bulletin*, Vol. 68, No. 2, page 401, February 1989, and the content of this article is incorporated herein by reference.

While the invention has been described in terms of coating fibers with nickel, other metal coatings can also be employed in practicing the present invention. For high temperature applications (temperatures above 500° C.), the following metals may be used to coat the fibers: actinium, aluminum, americium, antimony, barium, beryllium, boron, calcium, cerium, chromium, cobalt, copper, dysprosium, erbium, europium, gadolinium, germanium, gold, holmium, iridium, iron, lanthanum, lutetium, magnesium, manganese, molybdenum, neodymium, nickel, niobium, osmium, palladium, platinum, plutonium, praseodymium, rhenium, rhodium, ruthenium, scandium, selenium, silicon, silver, strontium, tantalum, terbium, thorium, titanium, tungsten, vanadium, ytterbium, yttrium and zirconium. For lower temperature applications, the following metals may be employed: bismuth, cadmium, cesium, gallium, indium, lead, rubidium, tellurium, thallium, tin and zinc.

While the invention has been described in terms of electroless plating of nickel, any suitable coating technique may be used to apply the metal to the substrate. Typical methods include: chemical vapor deposition, such as chemical decomposition and thermal decomposition; vacuum coating, such as physical vapor deposition (evaporation from electron beam sources or thermal sources), reactive evaporation, ion plating (evaporation or sputtering), sputtering and ion implantation and magnetron sputtering; electroless plating (copper, silver, gold, nickel, cobalt, palladium, platinum and rhodium); electrolytic plating (after surface is made conductive by other process); and metal spraying.

In addition, it is contemplated that single coatings as well as duplex and triplex coatings may be used in practicing the present invention. The duplex and triplex coatings are formed by applying the above coating materials in successive layers. Some common fiber coatings contemplated for use in the present invention include: powdered oxides, carbides, borides, silicides, sulphides from aluminum, boron, chromium, hafnium, molybdenum, silicon, calcium, tantalum, vanadium, tungsten, zirconium, manganese, barium, iron, nickel, titanium and powdered kaolin, glass, graphite, diamond can be codeposited with electroless nickel. Metal particles and alloys from boron, chromium, vanadium, titanium, tantalum, molybdenum, zirconium, hafnium, tungsten and stainless steel are also deposited with nickel. In addition, silicon, carbon, boron nitride, silicon carbide, titanium carbide, zirconium carbide, tungsten carbide, hafnium carbide, tantalum carbide, niobium carbide, zirconium carbide, titanium nitride and refractory metals such as tungsten, molybdenum and platinum.

While the invention has been described in terms of alumina filler material, other filler materials are contemplated for use in the present invention. Other filler materials include all those that are commonly used with refractory fibers. Some common filler materials contemplated for use in the present invention include silicon carbide whiskers. Other chromium containing materials such as chromium nitrate, chromium sulfate, chromic acetate and other chrome containing materials that are soluble in water can also be used in practicing the present invention.

It is contemplated that different amounts of filler material may be used in practicing the present invention. Thus for example, amounts other than 70–90 vol. % alumina may be used. One skilled in the art will appreciate that the higher the vol. % of the filler that is actually used the less porosity in the final cured part. This a result of the removal of water during curing. Although volume percents as high as 90% may be used, the upper limit of the actual percent of filler is not critical to practicing the invention. At the lower limit of the percentage of filler material used in practicing the present invention, the strength of the matrix will be greatly reduced when the percentage of the filler material is below 25%.

While the invention has been described in terms of preferred embodiments, it is intended that all matter contained in the above description shall be interpreted as illustrative. The present invention is indicated by the broad general meaning of the terms in which the appended claims are expressed.

What is claimed is:

1. A method of forming fiber reinforced aluminum phosphate bonded refractory material, the method comprising the steps of:
preparing a slurry by blending alumina having an average particle size of less than approximately 10 microns and aluminum phosphate solution, said slurry being substantially free of silica;
infiltrating said slurry into a substrate comprising fibrous material coated with a metal to form an infiltrated substrate; and
curing said infiltrated substrate to form a fiber reinforced aluminum phosphate bonded refractory material.

2. The method of claim 1 in which said step of preparing a slurry includes:
preparing a solution of from about 30 to about 70 wt. % monoaluminum phosphate solution and from about 30 to about 70 wt. % $H_2O$;
blending from approximately 10–70 wt. % alumina into said solution.

3. The method of claim 1 in which said step of infiltrating said slurry into a fibrous substrate coated with a metal, includes:
infiltrating said slurry into a fibrous substrate selected from the group consisting of SiC fibers, TiC fibers, aluminum borosilicate fibers, alumina fibers, carbon fibers, graphite fibers, silicon nitride fibers, boron/tungsten fibers, boron carbide fibers, boron carbide/tungsten fibers, boron nitride fibers, beryllium fibers, zirconia fibers and aluminum silicate fibers.

4. The method of claim 1 in which said step of infiltrating said slurry into a fibrous substrate coated with a refractory metal, includes:
infiltrating said slurry into a fibrous substrate coated with a metal selected from the group consisting of nickel, tungsten, molybdenum, platinum, copper, silver, gold, palladium, osmium, rhenium, cobalt, chromium and titanium.

5. The method of claim 1 in which said step of preparing a slurry includes:
preparing a slurry by blending alumina having an average particle size of less than approximately 10 microns and aluminum phosphate solution containing 4–10 wt. % chrome, said slurry being substantially free of silica.

6. The method of claim 1 in which said step of curing said infiltrated substrate, includes:
heating said infiltrated substrate to a temperature of less than approximately 400 degrees centigrade.

7. The method of claim 1 in which said step of curing said infiltrated substrate includes:
heating said infiltrated substrate to a temperature of less than approximately 400 degrees centigrade at a pressure of approximately 200 pounds per square inch.

8. The method of claim 1 in which said step of curing said infiltrated substrate includes:
heating said infiltrated substrate to a temperature of less than approximately 400 degrees centigrade at a pressure of approximately 200 pounds per square inch for approximately 4 hours.

9. The method of claim 1 in which said step of curing said infiltrated substrate includes:
heating said green matrix to a temperature of less than approximately 180 degrees centigrade at a pressure of up to approximately 100 pounds per square inch for approximately 1 hour.

10. The method of claim 1 in which said step of curing said infiltrated substrate includes:
heating said fiber reinforced aluminum phosphate bonded refractory material in air at a temperature less than approximately 400 degrees centigrade for one hour.

11. A method of forming fiber reinforced aluminum phosphate bonded refractory material, the method comprising the steps of:
forming a refractory metal coating on fabric;
preparing a slurry prepared by blending alumina and aluminum phosphate solution, said slurry being substantially free of silica;
impregnating said fabric with said slurry;
drying said impregnated fabric to form a green matrix; and
curing said green matrix to form said fiber reinforced aluminum phosphate bonded refractory material.

12. The method of claim 11 in which said step of forming a refractory metal layer on fabric, includes:
coating said fabric with a refractory metal selected from the group consisting of nickel, tungsten, molybdenum, platinum, copper, silver, gold, palladium, cobalt, chromium and titanium.

13. The method of claim 11 in which said step of forming a refractory metal layer on fabric, includes:
electrolessly plating said fabric with a refractory metal selected from the group consisting of nickel, tungsten, molybdenum, platinum, copper, silver, gold, palladium, cobalt, chromium and titanium.

14. The method of claim 11 in which said step of preparing a slurry includes:
preparing a solution of from about 30 to about 70 wt. % monoaluminum phosphate solution and from about 30 to about 70 wt. % $H_2O$;
blending from approximately 10–70 wt. % alumina into said solution.

15. The method of claim 11 in which said step of impregnating said fabric includes:
vacuum infiltrating said slurry into said fabric.

16. A fiber reinforced aluminum phosphate bonded refractory material comprising:
a matrix formed from a slurry prepared by blending alumina and aluminum phosphate solution, said slurry being substantially free of silica; and
refractory fiber coated with refractory metal.

17. The fiber reinforced aluminum phosphate bonded refractory material of claim 16 in which the matrix is prepared from a solution of from about 30 to about 70 wt. % monoaluminum phosphate solution and from about 30 to about 70 wt. % $H_2O$ containing approximately 30–80 wt. % alumina.

18. The fiber reinforced aluminum phosphate bonded refractory material of claim 16, in which said fiber is selected from the group consisting of SiO fibers, TiC fibers, aluminum borosilicate fibers, alumina fibers, carbon fibers, graphite fibers, silicon nitride fibers, boron/tungsten fibers, boron carbide fibers, boron carbide/tungsten fibers, boron nitride fibers, beryllium fibers, zirconia fibers and aluminum silicate fibers.

19. The fiber reinforced aluminum phosphate bonded refractory material of claim 16, in which said refractory metal is selected from the group consisting of nickel, tungsten, molybdenum, platinum, copper, silver, gold, palladium, cobalt, chromium and titanium.

20. The fiber reinforced aluminum phosphate bonded refractory material of claim 16, in which said refractory metal coating is 100 Å to 100 microns in thickness.

21. The fiber reinforced alumina phosphate bonded refractory material in claim 16 in which said matrix contains from about 10 to about 75 vol. % fibers.

22. The fiber reinforced aluminum phosphate bonded refractory material of claim 16, in which said slurry contains alumina having an average particle size of less than approximately 10 microns.

23. The fiber reinforced aluminum phosphate bonded refractory material of claim 16, in which alumina is from about 25 to about 90 wt. % of said matrix material.

24. The fiber reinforced aluminum phosphate bonded refractory material of claim 16, in which said slurry contains from 20-80 wt. % monoaluminum phosphate solution.

25. The fiber reinforced aluminum phosphate bonded refractory material of claim 16, in which said refractory material is formed by:
impregnating said refractory fiber with said slurry;
drying said impregnated refractory fiber to form a green matrix; and
curing said green matrix to form said fiber reinforced aluminum phosphate bonded refractory material.

26. The fiber reinforced aluminum phosphate bonded refractory material of claim 16, in which said refractory fiber coated with refractory metal is formed by:
electrolessly coating refractory fiber with a refractory metal selected from the group consisting of nickel, tungsten, molybdenum, platinum, copper, silver, gold, palladium, cobalt, chromium and titanium.

27. A fiber reinforced aluminum phosphate bonded refractory material comprising:
(a) a matrix material of:
20-90 wt % alumina having a particle size of less than about 10 microns
0-1 wt % silica
10-80 wt % aluminum phosphate solution; and
(b) refractory fiber coated with refractory metal.

28. The fiber reinforced material of claim 27 in which said refractory fiber is selected from the group consisting of SiC fibers, TiC fibers, aluminum borosilicate fibers, alumina fibers, carbon fibers, graphite fibers, silicon nitride fibers, boron/tungsten fibers, boron carbide fibers, boron carbide/tungsten fibers, boron nitride fibers, beryllium fibers, zirconia fibers and aluminum silicate fibers.

29. The fiber reinforced material of claim 27 in which said refractory metal is selected from the group consisting of nickel, tungsten, molybdenum, platinum, copper, silver, gold, palladium, cobalt, chromium and titanium.

* * * * *

UNITED STATES PATENT AND TRADEMARK OFFICE
CERTIFICATE OF CORRECTION

PATENT NO. : 5,371,050
DATED : December 6, 1994
INVENTOR(S) : D.L. Belitskus, D.J. Boland, W.T. Evans, W.P. Kampert, R.A. Marra and L.F. Wieserman It is certified that error appears in the above-indentified patent and that said Letters Patent is hereby corrected as shown below:

Col. 12, line 58        Change "SiO" to --SiC--.
Claim 18, line 3

Signed and Sealed this

Twenty-first Day of February, 1995

Attest:

BRUCE LEHMAN

Attesting Officer        Commissioner of Patents and Trademarks